(12) United States Patent
Madzgalla et al.

(10) Patent No.: US 12,209,626 B2
(45) Date of Patent: Jan. 28, 2025

(54) RESTORING DEVICE FOR RESTORING A BRAKE PAD

(71) Applicant: ZF Active Safety GmbH, Koblenz (DE)

(72) Inventors: Lukas Madzgalla, Lahnstein (DE); Marco Becker, Oberduerenbach (DE); Peter Maeurer, Koblenz (DE); Paul Wecker, Limburg (DE); Joerg Knieper, Vallendar (DE); Florian Rössinger, Neuwied (DE); Philipp Schwenzer, Urmitz (DE); Guido Zenzen, Macken (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 343 days.

(21) Appl. No.: 17/704,169

(22) Filed: Mar. 25, 2022

(65) Prior Publication Data
US 2022/0307561 A1 Sep. 29, 2022

(30) Foreign Application Priority Data

Mar. 29, 2021 (DE) ..................... 10 2021 203 095.5

(51) Int. Cl.
*F16D 65/097* (2006.01)
*F16D 55/226* (2006.01)
(Continued)

(52) U.S. Cl.
CPC ....... *F16D 65/0068* (2013.01); *F16D 55/226* (2013.01); *F16D 65/0972* (2013.01);
(Continued)

(58) Field of Classification Search
CPC .. F16D 65/0068; F16D 65/0972; F16D 65/18; F16D 65/58; F16D 2055/0029; F16D 2121/02; F16D 2127/02
(Continued)

(56) References Cited

U.S. PATENT DOCUMENTS 7,721,854 B1 * 5/2010 Mackiewicz ........... F16D 65/54
188/73.44
9,382,957 B2 * 7/2016 Asen ...................... F16D 65/18
(Continued)

FOREIGN PATENT DOCUMENTS

DE 102013016779 A1 4/2015
DE 102019210316 A1 1/2021

OTHER PUBLICATIONS

German Search Report for corresponding German Application Serial No. DE 10 2021 203 095.5, dated Jan. 11, 2022, pp. 1-8.

*Primary Examiner* — Christopher P Schwartz
(74) *Attorney, Agent, or Firm* — Tarolli, Sundheim, Covell & Tummino LLP

(57) ABSTRACT

The invention relates to a restoring device (1) for restoring a brake pad of a motor vehicle disc brake, and to a motor vehicle disc brake which comprises a restoring device of this type.
The restoring device (1) comprises a wear compensation means (2) and a tension arrangement (7) for generating a restoring force, having a bearing region (10) for support on a brake carrier of the motor vehicle disc brake, and a coupling section (8),
the bearing region (10) defining a bearing plane (AE) by way of a bearing contact (11) which, when the tension arrangement (7) bears against the brake carrier, comes into contact with the latter.
Furthermore, the restoring device (1) comprises a coupling device (4), by way of which the wear compensation means
(Continued)

and the tension arrangement (7) are coupled to one another or can be coupled to one another in such a way that, in the coupled state of the wear compensation means (2) and the tension arrangement (7), it permits a perpendicular orientation of the wear compensation axis (VA) with respect to the bearing plane (AE) and an orientation of the wear compensation axis (VA) which differs from the perpendicular orientation and is inclined within a pivot angle range (a) towards the bearing plane (AE) in every extent direction of the bearing plane (AE).

15 Claims, 3 Drawing Sheets

(51) Int. Cl.
| | |
|---|---|
| *F16D 65/00* | (2006.01) |
| *F16D 65/18* | (2006.01) |
| *F16D 65/58* | (2006.01) |
| *F16D 55/00* | (2006.01) |
| *F16D 121/02* | (2012.01) |
| *F16D 127/02* | (2012.01) |

(52) U.S. Cl.
CPC ............ *F16D 65/18* (2013.01); *F16D 65/58* (2013.01); *F16D 2055/0029* (2013.01); *F16D 2121/02* (2013.01); *F16D 2127/02* (2013.01)

(58) Field of Classification Search
USPC .......... 188/73.1, 73.36–73.38, 73.44, 250 B, 188/250 G
See application file for complete search history.

(56) References Cited

U.S. PATENT DOCUMENTS

| | | | |
|---|---|---|---|
| 11,448,276 B2* | 9/2022 | Zenzen | F16D 65/0979 |
| 11,692,602 B2* | 7/2023 | Wecker | F16D 65/567 |
| | | | 188/71.9 |
| 2015/0008078 A1 | 1/2015 | Asen et al. | |
| 2017/0204926 A1 | 7/2017 | Previtali et al. | |
| 2021/0010554 A1* | 1/2021 | Wecker | F16D 65/0972 |
| 2023/0058671 A1* | 2/2023 | Wecker | F16D 65/0087 |

* cited by examiner

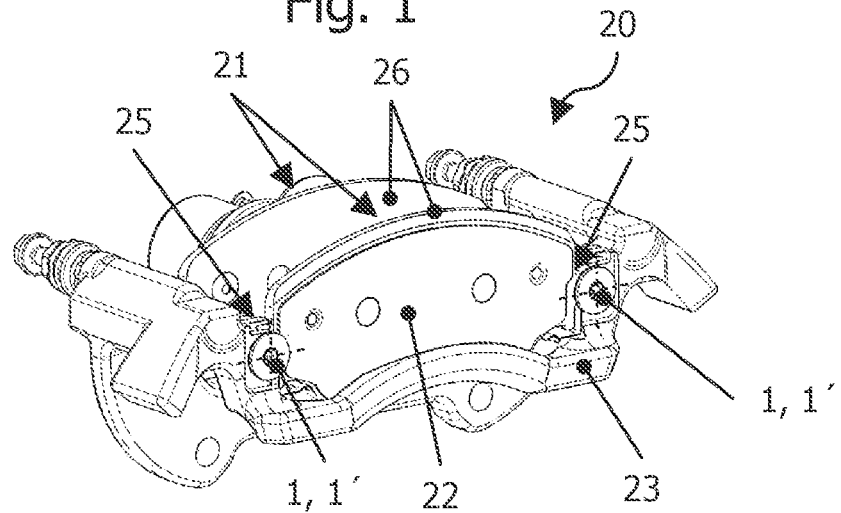
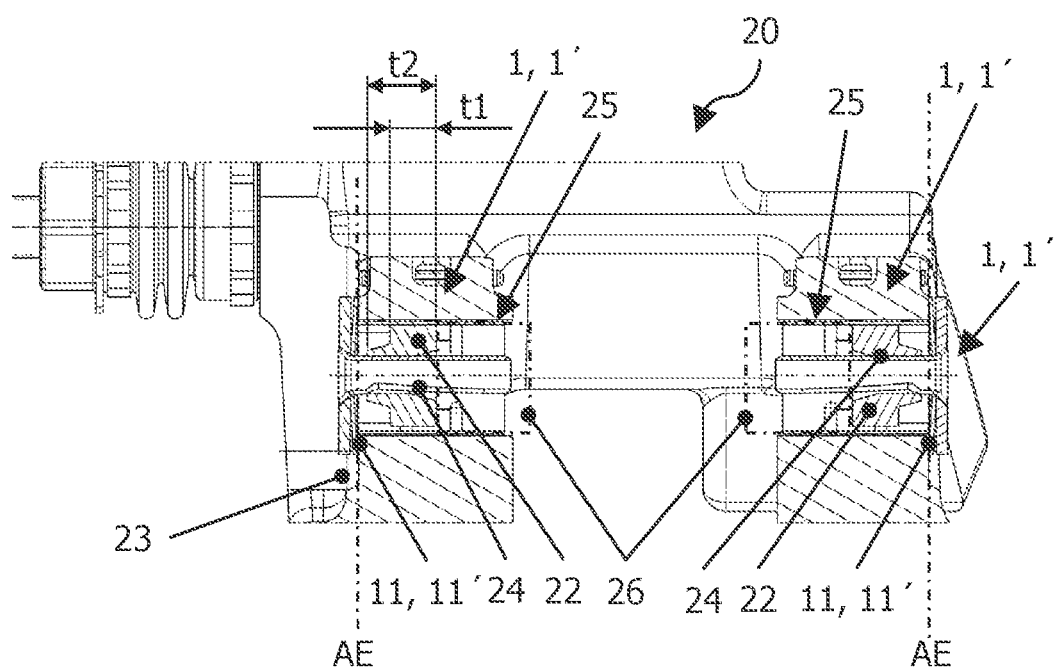

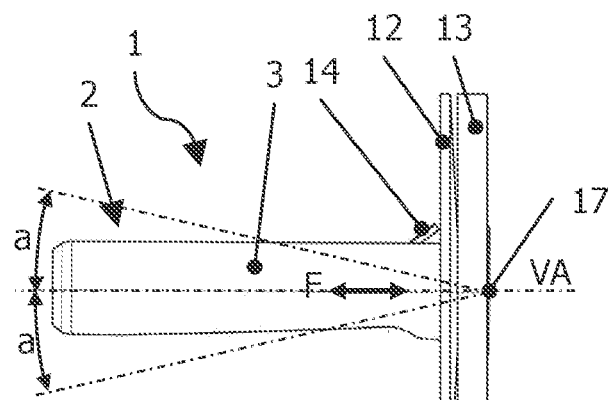
Fig. 3
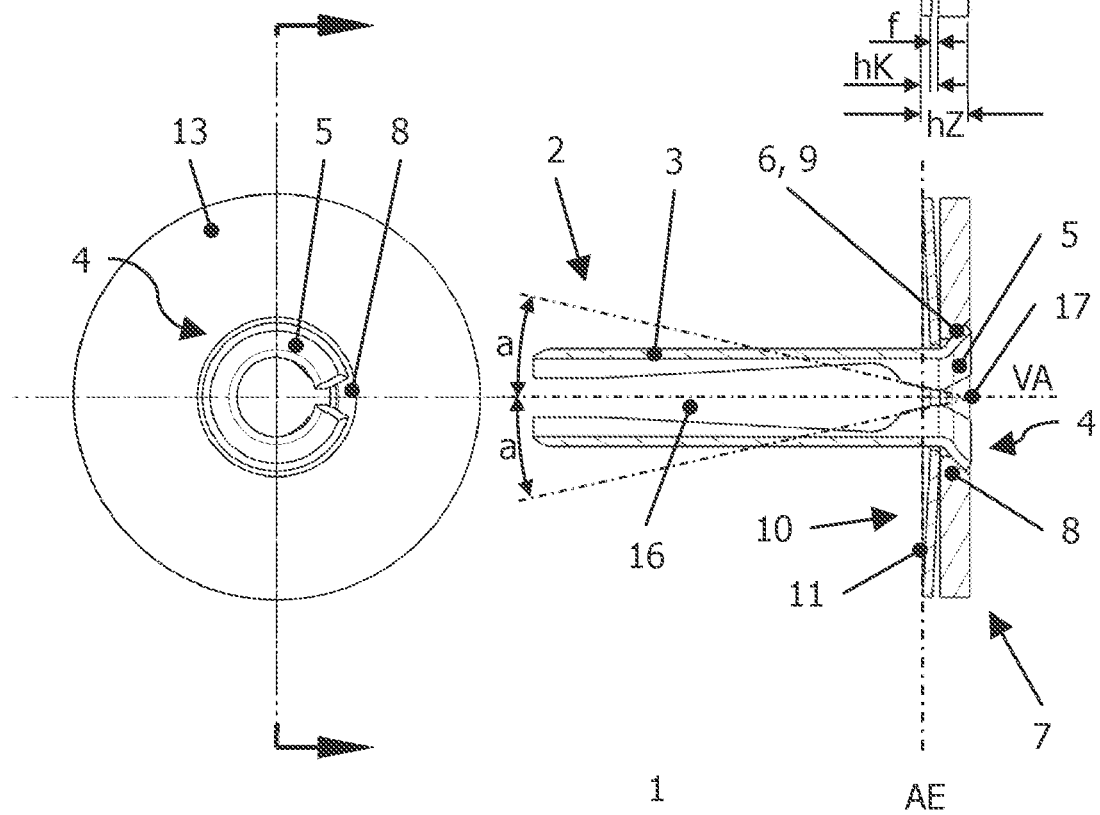
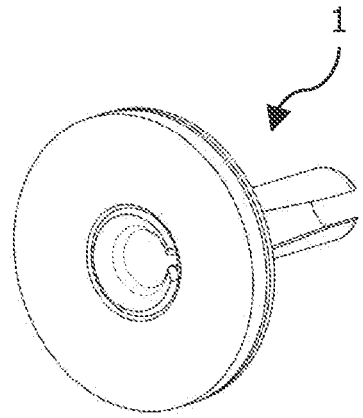
Fig. 4

RESTORING DEVICE FOR RESTORING A BRAKE PAD

RELATED APPLICATIONS

This application claims priority from German Patent Application DE 10 2021 203 095.5, 29 Mar. 2021, the entirety of which is hereby incorporated herein by reference.

TECHNICAL FIELD

The invention relates to a restoring device for restoring a brake pad of a motor vehicle disc brake. Furthermore, it relates to a motor vehicle disc brake with a restoring device of this type.

BACKGROUND

It is becoming more and more important for energy to be saved in motor vehicles. In the case of brake systems, in particular disc brakes, brake pads which drag on a brake disc in the non-actuated pressureless braking function case lead to an undesired braking force. In addition, particulate matter is produced as a result of the dragging of the brake pads. In order to eliminate disadvantages of this type, restoring devices are already known in the prior art. These restoring devices restore the brake pads into a rest position after an actuation operation. The restoring usually takes place via a restoring force, an air gap being provided between the brake pad and a brake disc by way of the restoring action into the rest position. The air gap makes a relative rotation, free from contact and therefore also free from friction and particulate matter, of the brake disc with respect to the brake pad possible. In restoring devices of this type, a wear compensation mechanism can also be configured which adjusts the rest position even in the case of increasing wear of the brake pads, in such a way that the air gap always remains constant in the actuation-free state of the brake device. Devices of this type are also known in the prior art. DE 10 2013 016 779 A1 and DE 10 2019 210 316 A1 disclose restoring devices of this type with a wear compensation function.

SUMMARY

It is an object of the present invention to provide a restoring device which makes a simple installation into a motor vehicle disc brake possible and ensures both a reliable restoring operation and a reliable wear adjustment operation. Furthermore, it is the object to provide a motor vehicle disc brake with a restoring device of this type.

The object which is set is achieved by way of a restoring device in accordance with the features of patent claim 1 and the features of patent claim 10. Advantageous refinements are indicated in the dependent patent claims.

The restoring device serves to restore a brake pad of a motor vehicle disc brake. It comprises a wear compensation means with a shank for frictionally locking connection to a pad rear plate of a brake pad, and with a coupling section which is arranged at one end of the shank, the shank defining a wear compensation axis VA by way of its longitudinal extent.

Furthermore, it comprises a tension arrangement for generating a restoring force, having a bearing region for support on a brake carrier of the disc brake, and a coupling section, the bearing region defining a bearing plane AE by way of a bearing contact which, when the tension arrangement bears against the brake carrier, comes into contact with the latter.

Moreover, it comprises a coupling device, via which the coupling section of the wear compensation means, by way of a contact region, and the coupling section of the tension arrangement, by way of a contact region, are coupled to one another or can be coupled to one another in such a way that, in the coupled state, the two contact regions are in contact with one another, and that forces and movements in the direction of the wear compensation axis VA can be transmitted between the wear compensation means and the tension arrangement.

The coupling device is such that, in the coupled state of the wear compensation means and the tension arrangement, it permits a perpendicular orientation of the wear compensation axis VA with respect to the bearing plane AE and an orientation of the wear compensation axis VA which differs from the perpendicular orientation and is inclined within a pivot angle range (a) towards the bearing plane AE in every extent direction of the bearing plane AE.

The shank of the wear compensation means is preferably configured as a slitted elastic sleeve, and the coupling section of the wear compensation means is configured by way of a bearing collar which is widened with respect to the shank. The sleeve and the bearing collar are preferably configured in one piece, the slit of the sleeve continuing as far as into the bearing collar.

The slit in the single-piece embodiment is advantageously configured in such a way that it decreases in size from the bearing collar in the direction of the opposite end of the sleeve. As a result, the slitted sleeve has a constant radial spring force over its length in the case of radial compression, which results, in the case of the use of the restoring device in a motor vehicle disc brake, in a frictionally locking connection with a constant frictional force regardless of the position of a brake pad on the sleeve.

The slit preferably also decreases in size in the direction of the bearing collar, with the result that the slit has the greatest width in the region between the bearing collar and the opposite end of the sleeve, and the slit has the smallest slit width in the region of the bearing collar. The small slit width in the region of the bearing collar contributes to the axial rigidity of the sleeve. Opposite slit edges preferably even make contact in the region of the bearing collar in order to increase the rigidity.

The tension arrangement can exert a restoring force and a restoring movement on the wear compensation means, and is connected via the coupling device to the wear compensation means for this purpose. Furthermore, accordingly, an application force and an application movement can also be transmitted from the wear compensation means to the tension arrangement via the coupling device.

The coupling device comprises the coupling section of the tension arrangement and the coupling section of the wear compensation means. The two coupling sections in each case have a contact region. When the wear compensation means and the tension arrangement are coupled to one another, the two contact regions are in contact with one another.

The coupling device is configured in such a way that it permits a pivoting movement of the wear compensation means about a pivot point in the manner of a ball joint, as far as the degrees of pivoting freedom are concerned. The pivot point lies in the region of the coupling device.

The possible pivot angle a in relation to an axis which is perpendicular with respect to the bearing plane AE preferably lies in a range from 0° to 15°.

The coupling device is therefore configured in such a way that a pivoting movement of the wear compensation means relative to the tension arrangement is possible in a manner which is free from material destruction and stress.

The pivoting capability is advantageous because, as a result, the restoring device can readily be installed into a motor vehicle disc brake and is functional, in the case of which the bearing face, for example the outer face of a brake carrier, is not oriented at a right angle with respect to the application movement direction of the associated brake pad. The restoring device can be installed easily. In the case of the installation of the restoring device into a motor vehicle disc brake, the tension arrangement bears suitably with the bearing contact against the brake carrier and compensates for angular deviations and, as a result, also provides a satisfactory transmission of force between the brake carrier and the restoring device. The pivoting capability also permits a movement of the brake pad within the brake carrier, without a wear compensation operation being triggered.

The contact region of the coupling section of the wear compensation means and/or the contact region of the coupling section of the tension arrangement preferably have/has a spherical shape.

The coupling section is preferably designed in such a way that the size of the contact remains constant in every pivoting position of the wear compensation axis VA within the pivot angle range a. Here, the contact is formed by way of the surfaces, contact points or contact lines which touch one another.

It is a further preferred refinement if the bearing contact is of annular configuration, whereby the restoring device can be supported on the brake carrier. It is an advantage of the annular configuration that a satisfactorily distributed transmission of force can take place between the brake carrier and the restoring device. Furthermore, the restoring device can be installed into a vehicle disc brake with every position rotated about the wear compensation axis VA. In every case, this results in the same size of contact with the brake carrier. This is also advantageous in the case of a C-shaped guide groove in the brake carrier, in the region of which guide groove the restoring device is favourably positioned. In the case of the annular configuration of the bearing contact, a sufficient contact between the bearing region of the tension arrangement and the brake carrier always results despite the absence of contact in the region of the groove in the brake carrier, regardless of how the restoring device is rotated about the wear compensation axis.

The external diameter of the annular bearing contact is preferably at least 20 mm.

The tension arrangement further preferably has an elastic force element and a supporting element. Here, the supporting element comprises the contact region (coupling to the wear compensation means) of the tension arrangement. The elastic force element and the supporting element are arranged in such a way that, in the coupled state of the wear compensation means and the tension arrangement, the elastic force element can exert a restoring force via the supporting element on the wear compensation means in the direction of the wear compensation axis VA.

The overall height hK of the elastic force element in the direction of its force action direction is further preferably in a ratio of from 2 to 10 to 1, preferably a ratio of from 2 to 6 to 1, to its possible elastic compression f in the direction of its force action direction. The force action direction can be both the force flow from the tension arrangement or the elastic force element to the wear compensation means, and the force flow from the wear compensation means to the tension element or the elastic force element.

The overall height hZ of the tension arrangement in the direction of the force action direction of the elastic force element is preferably in a ratio of from 6 to 25 to 1, preferably a ratio of from 6 to 15 to 1, to its possible elastic compression fin the direction of its force action direction.

The supporting element is preferably a supporting disc.

The elastic force element is preferably a compression spring. The elastic element is even more preferably a cup spring.

In the case of one preferred refinement, the elastic contact element comprises the bearing contact (contact with brake carrier).

As an alternative, the elastic force element can comprise a rubber element.

As an alternative to the use of a supporting element, in the case of the preferred cup spring embodiment, the cup spring can comprise the contact region (coupling to the wear compensation means) and the bearing contact (contact with brake carrier).

The abovementioned configuration options result in a small overall height of the region of the restoring device which projects from the brake carrier in the installed state. The space conditions in the region of vehicle disc brakes are constricted. The flat construction results in more design possibilities for the brake construction.

A fixing means which holds the tension arrangement captively in the region of the coupling device is preferably provided on the restoring device.

A fixing means of this type can be, for example, a notch, a projecting pin or a protuberance on the wear compensation means, in particular on the shank or the sleeve. This is advantageous for the transport and for the mounting of the restoring device.

The motor vehicle disc brake according to the invention comprises a restoring device in accordance with one of the above-described embodiments, a brake carrier, and a brake pad comprising a pad rear plate and a friction lining, the wear compensation means being operatively connected in a frictionally locking manner to the pad rear plate in such a way that a force and movement transmission takes place between the brake pad and the wear compensation means if a brake actuation does not exceed a predefined actuating travel and/or a predefined actuating force.

Furthermore, the frictionally locking operative connection is such that a wear adjustment takes place between the brake pad and the wear compensation means if a brake actuation exceeds a predefined actuating travel and/or a predefined actuating which can be provided by a brake actuator.

The pad rear plate serves to receive and to stabilize the friction lining and to transmit actuating forces. In addition, the pad rear plate favourably provides a guide function of the brake pad with respect to the brake carrier, in particular via a C-shaped groove arrangement in the brake carrier. Therefore, regions which project beyond the friction lining, such as, for example, guide lugs which serve to guide the brake pad in the brake carrier, also belong to the pad rear plate. The introduced actuation force is forwarded to the friction lining via the pad rear plate. The friction lining provides a friction face which can pass into bearing contact with the friction face of a brake disc. A brake torque is provided by way of the frictional force which occurs between the friction faces. The forces which occur are introduced into the brake carrier via the brake pad.

The restoring device is configured to move the brake pad back into a rest position after an actuation operation. The restoring takes place via a restoring force which is introduced by the restoring device into the brake pad. The tension arrangement favourably provides a restoring force of this type. The restoring device therefore ensures restoring of the brake pad into a rest position.

During operation of the motor vehicle disc brake, the thickness of the friction linings reduces as the number of braking operations increases, on account of the wear which occurs. The wear compensation means then ensures an adjustment, with the result that a desired air gap between the friction lining and the brake disc also remains unchanged for subsequent actuation operations. The wear compensation means accordingly ensures that the rest position of the brake pad changes, in order to provide a constant air gap in the rest position over the service life of the brake pads.

Furthermore, the restoring device is connected in a frictionally locking manner via the wear compensation means to the brake pad, in particular to the pad rear plate. As a result, a transmission of the restoring force to the brake pad is provided in a suitable way.

In the case of the application of an actuation force, the movement and the actuation force which the brake pad experiences towards a brake disc is transmitted via the frictionally locking connection from the pad rear plate to the wear compensation means and therefore to the tension arrangement. The latter is supported with its bearing region on the brake carrier and generates a counterforce.

When the actuation force is cancelled, the tension arrangement brings it about that the brake pad is moved away from the brake disc again and the air gap is set via the wear compensation means and via the frictionally locking connection between the wear compensation means and the pad rear plate.

The possible actuation travel of the wear compensation means is predefined by way of the design of the tension arrangement, and is limited by way of its structural construction and/or by way of the design of the elastic spring element.

If the movement of the brake pad exceeds the limited actuation travel of the tension arrangement, a further movement of the wear compensation means towards the brake disc is blocked. In this case, a relative displacement of the brake pads with respect to the wear compensation means takes place. Here, the actuation force exceeds the friction force of the frictionally locking connection, that is to say the friction between the wear compensation means and the opening. After the actuation has ended, the restoring device sets the desired air gap again. As a result, the restoring device compensates for the wear of the friction lining which has occurred. In the case of an adjusting operation of this type, the rest position of the friction lining changes, the desired air gap being re-established.

The restoring force of the restoring device is so great that the pad and housing displacement forces which counteract the restoring operation are overcome, and therefore resetting of the pads with a defined travel is ensured over the pad service life even under environmental influences, such as abrasion, corrosion, etc.

The maximum restoring force which the tension arrangement can generate preferably lies in a range of from 50 N to 180 N, more preferably in a range of from 80 N 150 N, and more preferably in a range of from 100 N to 130 N.

Undesired stresses in the parts of the restoring device or undesired jamming within the frictionally locking connection are avoided even during operation as a result of the degree of pivoting freedom in the coupling device of the restoring device, which brings about reliable restoring and a reliable wear adjustment.

The frictionally locking connection between the wear compensation means and the brake pad is expediently formed by the shank and an opening in the pad rear plate in such a way that the shank protrudes through the opening and a frictional force acts between the shank and the opening.

The shank is preferably guided with a prestress in the opening.

The prestress is preferably provided by way of the slitted elastic sleeve.

The external diameter of the sleeve in the relieved state is preferably greater than the diameter of the opening if it is configured as a bore.

In a further preferred refinement, the pad rear plate has a height t1. Here, a height t2 of the pad rear plate in the region of the opening is greater than the height t1.

t2 is preferably greater than t1 by from 1 mm to 6 mm, and more preferably by from 2 mm to 5 mm.

The region of higher configuration with the height t2 is preferably configured as a bulge or pressed-out portion, as a result of which that contact region of the opening which brings about the frictionally locking connection with the shank is arranged moved away from the friction lining.

In the case of pad wear, a residual overlap with the shank or the sleeve is still ensured by way of the greater height t2 and, in particular, by way of a bulge or pressed-out portion, which prevents undesired releasing of the brake pad from the wear compensation means and therefore increases the reliability of the wear adjustment.

The restoring device is preferably positioned with respect to the brake carrier in such a way that the part of the wear compensation axis VA which protrudes into the brake carrier is enclosed by the material of the brake carrier to such an extent that the tension arrangement with its bearing region does not slip from the brake carrier, on which it is supported, as a result of a tensile load which acts on the wear compensation means. In particular, the brake carrier can have at least one C-shaped guide groove, in which the pad rear plate of the brake pad is guided; here, the wear compensation axis VA runs within the C-shaped cut-out.

BRIEF DESCRIPTION OF THE DRAWINGS

In the following text, two exemplary embodiments of the restoring device according to the invention and one exemplary embodiment of the motor vehicle disc brake according to the invention will be explained on the basis of the diagrammatic illustrations of FIGS. 1 to 6, in which:

FIG. 1 shows one embodiment of the motor vehicle disc brake according to the invention with a restoring device, FIG. 2 shows a sectional view of the embodiment according to FIG. 1, FIG. 3 shows a first embodiment of the restoring device according to the invention in various views, FIG. 4 shows the embodiment according to FIG. 3 as a 3D illustration.

DESCRIPTION

Figure 5:
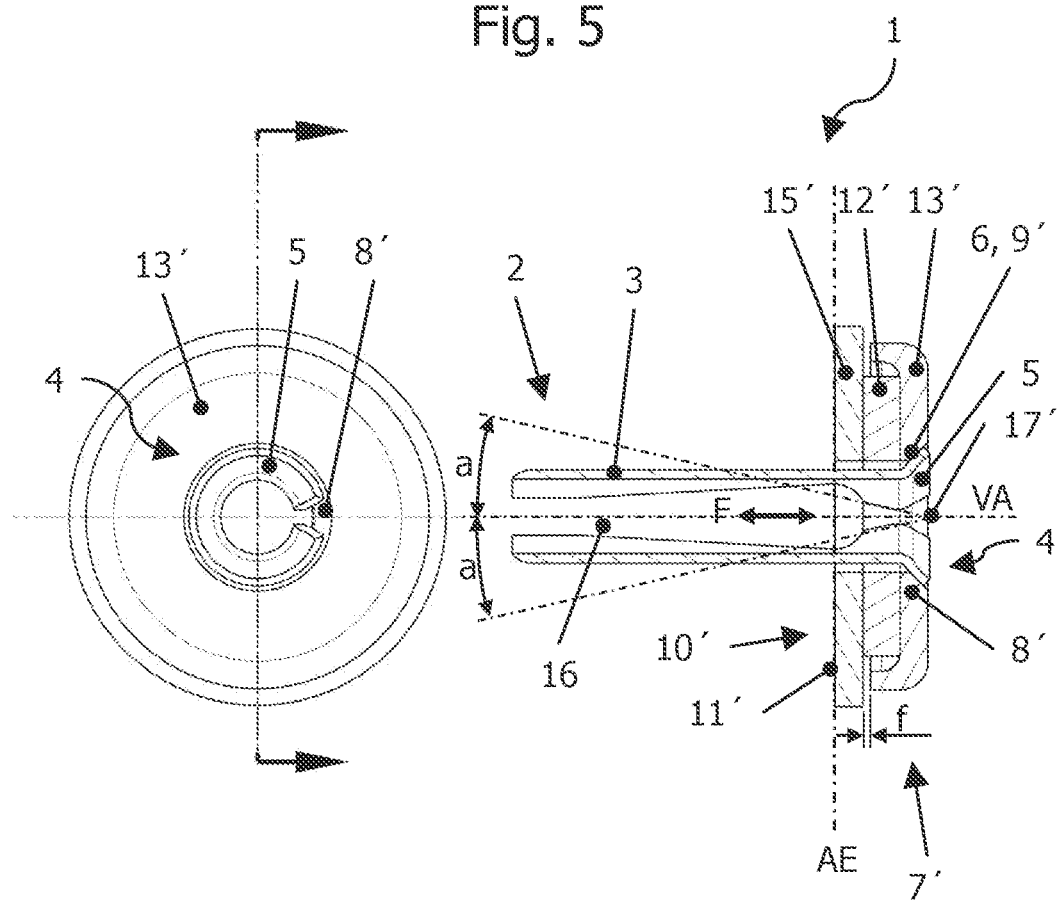
FIG. 5 shows a second embodiment of the restoring device according to the invention in various views.

In the case of the first embodiment of the restoring device (1) according to the invention, the wear compensation means (2) is formed from a shank (3) and a coupling section (5). The shank (3) is configured as a clamping sleeve. The coupling section (5) is configured as a bearing collar which has a greater external diameter than the clamping sleeve. The clamping sleeve and the bearing collar are configured in one piece, and the wear compensation means (2) has, in the longitudinal direction, a slit (16) which continues from the clamping sleeve as far as into the bearing collar. The slit (16) has a slit width which changes along the wear compensation means (2). The narrowest point is situated in the region of the bearing collar, as a result of which the axial rigidity of the clamping sleeve is increased. The slit (16) first of all becomes wider and then gradually narrower again in the direction of the free end of the clamping sleeve.

In the region of the coupling section (5) of the wear compensation means (2), the tension arrangement (7) is coupled with its coupling section (8) to the wear compensation means (2). The coupling section (8) is configured as an opening in a supporting element (13). The supporting element (13) is configured as a supporting disc. The coupling section (5) and the coupling section (8) in each case have a contact region (6, 9). Here, the contact region (6) of the coupling section (5) is in contact with the contact region (9) of the coupling section (8). The contact region (6) of the coupling section (5) of the wear compensation means (2) is an outer face of the bearing collar. The contact region (9) of the coupling section (8) of the tension arrangement (7) is an inner face of the opening in the supporting element (13). Both the outer face of the bearing collar and the inner face of the opening are configured as spherical segment faces with a respective identical sphere diameter, with the result that the wear compensation means (2) can pivot about the common sphere centre point (17). Here, the coupling section (8) of the tension arrangement (7) is embedded in the supporting element (13), with the result that the tension arrangement (7) and the coupling section (8) terminate flush on the side which faces away from the shank (3).

Tolerance fluctuations can lead, as an alternative, to the sphere diameters differing from one another and to the coupling section (5) bearing correspondingly in the coupling section (8) in a manner which bears rather on the inside or rather on the outside. The sphere centre points (17) are then not quite congruent.

Furthermore, the tension arrangement (7) comprises an elastic force element (12) which is configured as a cup spring. Just like the supporting disc, the cup spring is plugged onto the clamping sleeve, and is supported on the supporting disc. Together with the supporting disc, the cup spring can pivot about the sphere centre point (17), and/or the wear compensation means (2) can pivot about the sphere centre point (17) with respect to the complete tension arrangement (7). In the case of an actuation of the restoring device (1) in the installed state, the movement travel of the wear compensation means is limited accordingly by way of the possible spring travel of the cup spring.

The clamping sleeve (3) has a fixing means (14) in the form of a projecting pin, by way of which the wear compensation means and the tension arrangement are held together.

Figure 6:
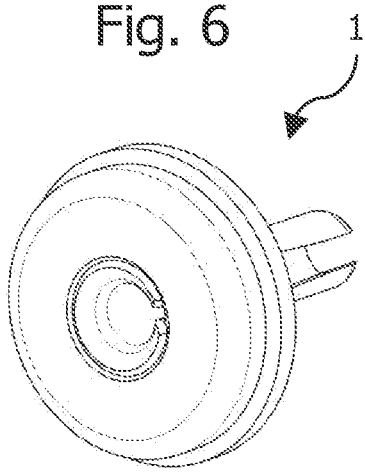
FIG. 6 shows the embodiment according to FIG. 5 as a 3D illustration.

The second embodiment of a restoring device (1) according to the invention is shown in FIGS. 5 and 6. It differs from the first exemplary embodiment merely in terms of the configuration of the tension arrangement (7'), in particular in terms of the type of the elastic element (12').

The difference lies in the fact that the supporting element (13') is provided as a plate with a bent-over peripheral plate edge, and that the elastic force element (12') is a rubber disc which bears with one side in the plate. On its other side, the rubber disc bears against a bearing element (15) which is likewise configured as a disc. The rubber disc is therefore enclosed between the supporting element (13') and the bearing element (15). The plate edge has a smaller height than the force element (12'), with the result that the force element can be compressed between the supporting element (13') and the bearing element (15). This construction defines the possible limited movement travel of the wear compensation means (2) in the installed state of the restoring device (1). In this second exemplary embodiment, the bearing region (10') and the bearing contact (11') are provided by the bearing element (15).

The coupling device (4) is of identical design to the first exemplary embodiment. Here, the coupling section (8') with its contact region (9') is contained in the supporting element (13') which is configured as a plate.

FIGS. 1 and 2 show those parts of the motor vehicle disc brake (20) which are relevant with regard to the invention, which motor vehicle disc brake (20) is a floating calliper brake in the exemplary embodiment. In the brake carrier (23), two brake pads are guided with guide parts of the pad rear plates (22) in C-shaped grooves (25) of the brake carrier (23). As a result of this guidance, the brake pads (21) can be moved in a translational manner towards or away from the brake disc (not shown). In the completely assembled state on a vehicle, the brake disc would be situated between the two brake pads (21).

In FIG. 2, on account of the sectional illustration which does not look in the direction of the friction linings (26), the friction linings (26) of the brake pads (21) are indicated only by way of a dash-dotted line.

The restoring device (1) is supported in each case in the region of the C-shaped grooves (25) against the brake carrier (23). Here, the bearing region (10, 10') comes into contact by way of an annular bearing contact (11, 11') with the outer face of the brake carrier (23), and bridges the cut-out region of the C-shaped groove (25).

The wear compensation axis (VA) of the wear compensation means (2) runs within the respective C-shaped groove (25), with the result that undesired slipping of the bearing region (10, 10') from the brake carrier (23) is prevented.

The shank of the wear compensation means (2) protrudes into the C-shaped groove (25), and is operatively connected to the pad rear plate (22) in a frictionally locking manner. For this purpose, the shank (3), configured as a clamping sleeve, of the wear compensation means (2) is guided in a prestressed manner in an opening (24), configured as a bore, in the pad rear plate (22) and protrudes through the latter. The pad rear plate (22) has a greater height (t2) in the region of the opening (24) than in its remaining region. The result of this greater height of the pad rear plate (22) is a dome-shaped configuration of the leadthrough for the wear compensation means (2).

The C-shaped groove (25) and the opening (24) and therefore also the wear compensation means (2) with its wear compensation axis (VA) are configured so as to be aligned in parallel with respect to the movement direction of the brake pad in the C-shaped groove guide system of the brake carrier (23). An angular deviation of the wear compensation axis (VA) from the bearing plane (AE) which differs from 90° is compensated for by way of the pivoting capability of the wear compensation means with respect to the tension arrangement.

The possible movement travel in the case of a brake actuation without wear adjustment is limited by way of the possible spring travel of the cup spring. If this spring travel is exceeded, for example on account of friction lining wear which has occurred, a higher force acts on the positively locking connection of the wear compensation means (2) and the pad rear plate (22), and a relative movement occurs between the wear compensation means (2) and the brake pad (21), as a result of which the wear adjustment is brought about. If the brake is released, the cup spring pulls the wear compensation means (2) and the brake pad (21) back again into the rest position, in the case of which the desired air gap from the brake disc is set. The adjustment which is brought about between the wear compensation means (2) and the brake pad (21) is maintained until a further adjustment takes place on account of further friction lining wear.

The invention claimed is:

1. The restoring device (1) for restoring a brake pad of a motor vehicle disc brake, comprising:
    a wear compensation means (2) with a shank (3) for frictionally locking connection to a pad rear plate of a brake pad, and with a first coupling section (5) which is arranged at one end of the shank (3), the shank (3) defining a wear compensation axis (VA) by way of its longitudinal extent, and
    a tension arrangement (7) for generating a restoring force, having a bearing region (10) for support on a brake carrier of the motor vehicle disc brake, and a second coupling section (8), the bearing region (10) defining a bearing plane (AE) by way of a bearing contact (11) which comes into contact with the brake carrier when the tension arrangement (7) bears against the brake carrier,
    wherein the first coupling section (5) of the wear compensation means (2), by way of a contact region (6) of the first coupling section (5), and the second coupling section (8) of the tension arrangement (7), by way of a contact region (9) of the second coupling section (8), are coupled to one another or can be coupled to one another in such a way that, in the coupled state, the two contact regions (6, 9) are in contact with one another, and that forces and movements in the direction of the wear compensation axis (VA) can be transmitted between the wear compensation means (2) and the tension arrangement (7),
    wherein the coupling between the first coupling section (5) and the second coupling section (8) is such that, in the coupled state of the wear compensation means (2) and the tension arrangement (7), it permits
        a perpendicular orientation of the wear compensation axis (VA) with respect to the bearing plane (AE), and
        an orientation of the wear compensation axis (VA) which differs from the perpendicular orientation and in which the wear compensation axis (VA) is at a non-ninety degree angle relative to the bearing plane (AE), the angle being within a pivot angle range (a).

2. The restoring device (1) according to claim 1, the tension arrangement (7) having an elastic force element (12) and a supporting element (13), the supporting element (13) comprising the contact region (9) of the tension arrangement (7), and the elastic force element (12) and the supporting element (13) being arranged in such a way that, in the coupled state of the wear compensation means (2) and the tension arrangement (7), the elastic force element (12) can exert a restoring force via the supporting element (13) on the wear compensation means (2) in the direction of the wear compensation axis (VA).

3. The restoring device (1) according to claim 2, a ratio of the overall height (hK) of the elastic force element (12), measured in a force action direction (F), to a total distance that the elastic force element (12) can be compressed in the force action direction (F) being in the range of 2:1 to 10:1, the force action direction (F) being the direction in which the elastic force element (12) exerts the restoring force on the wear compensation means (2).

4. The restoring device (1) according to claim 3, the ratio being in the range of 2:1 to 6:1.

5. The restoring device (1) according to claim 2, a ratio of the overall height (hZ) of the tension arrangement (7), measured in a force action direction (F), to a total distance that the tension arrangement (7) can be compressed in the force action direction (F) being in the range of 6:1 to 25:1, the force action direction (F) being the direction in which the elastic force element (12) exerts the restoring force on the wear compensation means (2).

6. The restoring device (1) according to claim 5, the ratio being in the range of 6:1 to 15:1.

7. The restoring device (1) according to claim 2, the elastic force element (12) being a cup spring.

8. A motor vehicle disc brake (20) comprising:
    a restoring device (1) according to claim 1,
    a brake carrier (23), and
    a brake pad (21) comprising a pad rear plate (22) and a friction lining (26), the wear compensation means (2) being operatively connected in a frictionally locking manner to the pad rear plate (22) in such a way
        that a force and movement transmission takes place between the brake pad (21) and the wear compensation means (2) if a brake actuation does not exceed a predefined actuating travel and/or a predefined actuating force of the tension arrangement (7); and
        that a wear adjustment takes place between the brake pad (21) and the wear compensation means (2) if a brake actuation exceeds a predefined actuating travel and/or a predefined actuating force of the tension arrangement (7).

9. The motor vehicle disc brake (20) according to claim 8, the frictionally locking connection between the wear compensation means (2) and the brake pad (21) being formed by the shank (3) and an opening (24) in the pad rear plate (22) in such a way that the shank (3) protrudes through the opening (24) and a frictional force acts between the shank (3) and the opening (24), and the pad rear plate (22) having a first height (t1), and a second height (t2) of the pad rear plate (22) in the region of the opening (24) being greater than the first height (t1).

10. The restoring device (1) according to claim 9, the second height (t2) being in the range of 1 mm to 6 mm greater than the first height (t1).

11. The restoring device (1) according to claim 9, the second height (t2) being in the range of 2 mm to 5 mm greater than the first height (t1).

12. The restoring device (1) according to claim 1, the contact region (6) of the first coupling section (5) of the wear compensation means (2) and/or the contact region (9) of the second coupling section (8) of the tension arrangement (7) having a spherical shape.

13. The restoring device (1) according to claim 1, the size of the contact between the two contact regions (6, 9) remaining constant in every pivoting position of the wear compensation axis (VA) within the pivot angle range (a).

14. The restoring device (1) according to claim 1, the bearing contact (11) being of annular configuration, whereby the restoring device (1) can be supported on the brake carrier.

15. The restoring device (1) according to claim 1, the restoring device (1) comprising a fixing means (14) which holds the tension arrangement (7) captively in the region of the coupling device (4).

* * * * *